US006242726B1

(12) United States Patent
Harris et al.

(10) Patent No.: US 6,242,726 B1
(45) Date of Patent: Jun. 5, 2001

(54) ADJUSTABLE MICROWAVE FIELD STOP

(76) Inventors: George M. Harris, 185 Scribner Blvd., Lewiston, ME (US) 04240; Peter Robicheau, 215 Cypress St., Scarborough, ME (US) 04074; Leonard J. Groves, Hadlock Rd., Windham, ME (US) 04055

( * ) Notice: Subject to any disclaimer, the term of this patent is extended or adjusted under 35 U.S.C. 154(b) by 0 days.

(21) Appl. No.: 09/126,551

(22) Filed: Jul. 30, 1998

Related U.S. Application Data

(63) Continuation-in-part of application No. 08/993,963, filed on Dec. 18, 1997, which is a continuation of application No. 08/754,307, filed on Nov. 21, 1996, now Pat. No. 5,756,975.

(51) Int. Cl.[7] ................................................. H05B 6/46
(52) U.S. Cl. ........................................... 219/764; 219/709
(58) Field of Search ..................................... 219/764, 750, 219/747, 778, 780, 696, 739, 742, 753, 738, 741, 704, 705, 709

(56) References Cited

U.S. PATENT DOCUMENTS

| 3,321,605 | * | 5/1967 | Reker | 219/750 |
| 3,691,454 | * | 9/1972 | Hrubesh et al. | 324/316 |

(List continued on next page.)

FOREIGN PATENT DOCUMENTS

WO 92/01540    2/1992  (WO).

OTHER PUBLICATIONS

Advertisement, *Schilcher Microwave Press Type MBP*.
Advertisement, *Schilcher Microwave Pre–heater Type MDO*.
Advertisement, *Schilcher Universal Press System CB 480*.

*Concepts for Fiber–Based Structural Building Systems*, Theodore L. Laufenberg, USDA Forest Service. Proceedings of the International Panel and Engineered Wood Technology Exposition; Oct. 19–21, 1993; Atlanta, Ga.

*Radio Frequency Wood Gluing*, Application of RF to wood gluing started in the 1930s for the manufacture of bundles of veneer to make plywood. L.E. Clark Jr. Adhesives Age 1983.

*Parallam—New Structural Wood Composite*, M.T. Churchland, Published by the American Ceramics Society. *Ceramic Transactions*, vol. 59, pp.s 63–68.

*Evaluating The Dielectric Cure Characteristics of Laminated Wood Composites*, Christopher A. Lenth and Frederick A. Kamke, Virginia Tech. Poster display FPRS Conference 1996.

*Development of the Industrial Use of Dielectric Heating in the United Kingdom*, P. J. Hulls, Journal of Microwave Power, 17(a), 1982.

*An Exploratory Study of Microwave Heating in Drying of Hardwood Veneer*, P. Chen, P. Schmidt, and M. Sanio, Journal of Microwave Power and Electromagnetic Energy, vol. 25, No. 1, 1990.

(List continued on next page.)

Primary Examiner—Teresa Walberg
Assistant Examiner—Quang Van
(74) Attorney, Agent, or Firm—Holland & Hart, LLP

(57) ABSTRACT

An improved magnetic field stop. The field stop adjusts to allow different sizes of products to be passed through a microwave heating system. The field stop prevents undue radiation from escaping a heating chamber which is used in a microwave heating process for a variety of substrates.

4 Claims, 14 Drawing Sheets

U.S. PATENT DOCUMENTS

| | | | |
|---|---|---|---|
| 3,723,230 | 3/1973 | Troutner | 156/580 |
| 3,767,884 * | 10/1973 | Osepchuk et al. | 219/742 |
| 3,882,419 * | 5/1975 | Swartz et al. | 331/96 |
| 3,992,135 | 11/1976 | Camp, III | 425/174.2 |
| 4,018,642 | 4/1977 | Pike et al. | 156/272.2 |
| 4,020,311 | 4/1977 | Churchland | 219/693 |
| 4,093,840 | 6/1978 | Jean et al. | 219/697 |
| 4,124,823 | 11/1978 | Sechi | 330/56 |
| 4,186,044 * | 1/1980 | Bradley et al. | 156/379.8 |
| 4,303,820 * | 12/1981 | Stottmann et al. | 219/771 |
| 4,349,713 * | 9/1982 | Marsen | 219/739 |
| 4,456,498 | 6/1984 | Churchland | 156/275.5 |
| 4,711,982 * | 12/1987 | Millman | 219/739 |
| 4,714,812 * | 12/1987 | Haagensen et al. | 219/697 |
| 4,757,172 * | 7/1988 | Palaith et al. | 219/686 |
| 4,771,153 * | 9/1988 | Fukushima et al. | 219/709 |
| 4,833,304 * | 5/1989 | Ueda | 219/518 |
| 4,872,544 | 10/1989 | Churchland et al. | 198/382 |
| 5,008,506 * | 4/1991 | Asmussen et al. | 219/696 |
| 5,144,105 * | 9/1992 | Briggs et al. | 219/739 |
| 5,166,484 * | 11/1992 | Young et al. | 219/684 |
| 5,228,947 | 7/1993 | Churchland | 156/580.1 |
| 5,345,067 * | 9/1994 | Ohta et al. | 219/720 |
| 5,512,736 * | 4/1996 | Kang et al. | 219/750 |
| 5,552,583 * | 9/1996 | Berteaud et al. | 219/696 |
| 5,811,768 * | 9/1998 | Choi et al. | 219/704 |
| 5,841,113 * | 11/1998 | Kim | 219/739 |

OTHER PUBLICATIONS

*Microwave Processing of Polymers and Biomass Materials*, Clifford E. George, G. R. Lightsey, and A. G. Wehr, Materials Research Society Symp. Proc. vol. 124, 1988.

*Continuous System for the Drying of Lumber with Microwave Energy*, Derek Barnes, Lambertus Admiral, Robert L. Pike and Vishwa N. P. Mathur, Forest Products Journal, vol. 26, No. 5, May 1976.

*Microwave Power Applications and Energy Saving*, W. van Loock, M. de Pourcq and C. de Wagter, Laboratory Electromagnetism and Acoustics, State University of Ghent, Sint–Pietersnieuwstraat 41, B–9000, Ghent.

*Moisture Content Distribution In a Thin Wood Sample Heated by Microwave Energy in a Rectangular Waveguide*, A. Galperin, Journal of Microwave Power and Electromagnetic Energy, vol. 25, No. 2, 1990.

*Non–Linear Field Solutions of One–Dimensional Microwave Heating*, P. Jolly and I. Turner, Journal of Microwave Power and Electromagnet Energy, vol. 25, No. 1, 1990.

*Microwave Heating in Drying of Hygroscopic Materials*, Peishi Chen and David C. T. Pei, IEEE Montech Conference on Electrotechnologies, Nov., 1987.

*German System Makes Thicker Continuous Particleboard*, Bison–Werke, West Germany, M.I.T.S. Article Express, Wood and Wood Products, Aug., 1976.

*Drying Characteristics of Thick Lumber in a Laboratory Radio–Frequency/Vacuum Drying*, Stavros Avramidis and Fang Liu, Drying Technology, 12(8), 1994.

*Rapid Fixation of CCA Wood Preservative With Electromagnetic Energy*, William B. Smith, Philip F. Schneider and Helmuth Resch, Forest Products Journal, vol. 46, No. 7/8 Jul./Aug. 1996.

*Large Timbers Reconstituted From Small Trees Using Microwave Heated Pultrusion Systems*, Mark Churchland, Science and Engineering, vol. 72, 1995 (1 page).

*Utilization of Microwaves In Processing Of Polymer Composites*, Jianghua Wei and Martin C. Hawley, Polymeric materials science and engineering Spring meeting 1995, vol. 72.

*Radio Frequency and Microwave Heating Applicators and Their Use in Industry*, A.C. Metaxas, Polymeric materials science and engineering Spring meeting 1995, vol. 72, American Chem. Society.

*Advantages of High Frequency Electromagnetic Energy for Industrial Polymer Processing, Design, Simulation and Scale–up Techniques*, Michael C. Green, Fred. I. Friedlander and Fritz A. Schaefer, Polymeric materials science and engineering Spring meeting 1995, vol. 72, American Chem. Society.

*The Microwave Heating of Polyethers as a Simulation of the Microwave Polymerisation of Epoxides*, Henri Jullien and Smail Bourouina, Polymeric materials science and engineering Spring meeting 1995, vol. 72, American Chem. Society.

*Design Considerations for Manufacturing, Carbon Fiber Thermoplastic Composites Using Microwave Heating*, Arthur C. Lind and Frederick C. Wear, Polymeric materials science and engineering Spring meeting 1995, vol. 72, American Chem. Society.

*Technik*, Kaufmann, Holzbauwerk, Magazine pictures, 12–95.

*Istok Microwave*, Svetlana Electron Devices, Catalogue.

*Red Maple and Yellow–Poplar LVL From Ultrasonically Rated Veneer*, Jeffrey D. Kimmel and John J. Janowiak, Technical Note, Jul./Aug. 1995, pp. 54–58.

*Compression control and its significance in the manufacture and effects on properties of poplar LVL*, H. J. Zhang,Y.H. Chui, M. H. Schneider, Wood Science and Technology 28 (1994) pp. 285–290, Springer–Verlag 1994.

*Understanding Microwaves*, Micron Corporation, undated.

*Update*, NZ Forest Industries, October 1994, pp. 8–9.

*LVL opportunities lie offshore*, Vivienne McLean.

*Industrial Microwave Heating*, A. C. Metaxas and R. J. Meredith, Peter Peregrinus Ltd. on behalf of the Institution of Electrical Engineers, Power Engineering Series 4, 1993 (contents and introduction, pp. 1–4).

Continuous–Panel–System (CPS) Press and System design for the continuous production of particleboard and MDF, Dieffenbacher, Inc.

Hydraulic Presses and Press Lines for the Production of Particleboard, OSB and MDF, Dieffenbacher, Inc.

* cited by examiner

ADJUSTABLE MICROWAVE FIELD STOP

This is a continuation-in-part of application Ser. No. 08/993,963, filed on Dec. 18, 1997, which is a continuation of parent application Ser. No. 08/754,307, filed Nov. 21, 1996, which is hereby incorporated by reference in its entirety U.S. Pat. No. 5,756,975.

DESCRIPTION

BACKGROUND OF THE INVENTION

1. Technical Field

This invention relates to an apparatus and a method for the manufacture of engineered wood products, and more particularly to the use of microwaves to accelerate the curing of resins used in engineered wood products.

2. Background

Engineered wood products are made by combining wood fibers and a resin which hardens as it cures and binds the fibers together.

Traditionally, wood fiber in the form of layers of veneer or pieces of wood fiber of various sizes, have been made by being pressed together in a heated press. The heat from the press is transmitted to the wood fibers and binding material in the press by simple heat conduction from the press platens into the wood. As the binding material is heated, its curing time is decreased. After a certain amount of time at a certain temperature and pressure, the binding material is fully cured and may be released from the press. Before the binding agent has fully cured, the wood fibers and binding agent are placed under pressure in a press in order to put as much wood fiber in contact with the binding agent as possible. When pressed in this way and then hardened, the resulting product has the maximum strength and durability properties obtainable.

Since wood is a good insulator, transferring heat through wood by conductance has certain limitations. As the thickness of a piece of wood being heated and pressed increases, the amount of time that it takes in the press to transmit heat to the center of the work piece also increases. Beginning in the 1930's, it was found that radio frequency (RF) energy could be used successfully to pass energy through layers of wood and glue in order to heat the interior mass and cause the glue to cure faster. Some ways of applying RF and microwave energies to these products were in devices which are similar to a giant waffle iron through which RF energy is passed from one plate to another through the engineered lumber "waffle". Another method is to form a billet of material consisting of wood veneer strands combined with adhesive, then placing the billet in a press and squeezing it from the top, bottom and two sides, and while under pressure, illuminating the interior of the billet with microwaves which are directed from one or both sides of the billet. In order to resist the pressure applied by the press, microwave energy which is applied through the sides of the billet enters the press chamber through a window which is strong enough to withstand the pressures of the press, and which is also transparent to microwave energies.

Microwaves heat the billet during such a pressing operation by excitation and rotational oscillatory movement of polar molecules, such as water molecules, inside the billet caused by the oscillating electric fields that are part of the microwave signal.

As the microwave signals strike a wood product prior to and during pressing, a portion of the microwaves are reflected back toward the microwave source which originally produced the microwaves. This reflective signal is usually channeled to a dissipating dummy load that is connected to a device in the microwave source itself. This reflected and dissipated microwave power is wasted and is not used in the heating of the wood product. RF energy is similarly directed into a billet of engineered wood material. RF energy is carried directly into the lay-up assembly or billet where it excites the polar molecules in the materials of the lay-up assembly. This interaction generates heat in the polar molecules which causes the shortening of curing times for binding agents.

However, a problem that has been encountered with the use of RF energy is that when RF is directed into a billet of veneer and glue layers in a direction parallel to the glue lines, and where the glue used is an alkaline solution of phenol formaldehyde resin, which is the most common of binding agents, the energy can cause arcing and tracking, especially along the layer of glue. The thicker the layer of glue, or the higher the water content of the glue, the more that the arcing and tracking becomes a problem. The reason for this undesirable effect is a relatively high conductivity of the resin which can lead to breakdown as the electric field from the microwave is integrated along a single axis. The arcing problem is greatly reduced if the electric field is applied perpendicular to the planes formed by the wood veneer layers and the layers of glue between them.

Another problem encountered in making engineered wood products is that energy directed into the billet while it is under pressure can cause moisture within the layers of wood to flash or boil away rapidly. When the pressure on the billet is released, if the pressure from expanding gasses is greater than the strength of the binding material holding the wood fibers together, the expanding gasses can cause a blowout.

Still another problem encountered in making engineered wood products which are heated by microwaves directed from the side of the billet toward the center of the billet while the billet is under pressure in a press is that the width of material through which the microwave energy can pass so that the center of the material is heated is limited. Billets which are very much wider than 24 inches are difficult to heat from side applied microwave energy. If these billets are not only wide in the lateral dimension, but also thick in the dimension normal to the longitudinal axis, they are also difficult to heat by conduction from the press platens because of their thickness. Therefore, the thickness of billets is limited by the prior art techniques of heating through conduction from the press platens and side directed microwave energy in the press.

Another problem with the current technology of preparing engineered wood products is that the process is fairly sensitive to variations in moisture content. Since the wood itself can have wide variations in density and moisture content, a common practice is to dry the wood to a uniform and low moisture content, and then to add back enough water to bring the wood fibers to the preferred moisture content. This preparation of the wood fiber is expensive and time consuming.

Accordingly, it is an object of the invention to provide a means by which wide work pieces can be uniformly heated by microwave energy, and in which width is not a factor or limitation. Another object of the invention is to provide a microwave heating system in which water vapor from the work piece can escape, decreasing the possibility for blow outs in the wood fiber.

A further object of the invention is to provide a system which can accommodate a greater variation in the moisture content of the wood fibers than permitted in the prior art. Related to the ability to operate with more variation in the moisture content of the wood fiber, it is an object of the current invention to operate at a reduced price due to reduced expenses of preparation of the wood fiber materials.

It is a further object of the invention to provide a microwave heating system which provides for maximum efficiency in the use of microwave energy.

It is a further object of this invention to be able to heat a billet of fibrous material to a given temperature, such that the heat is evenly distributed throughout the billet, or can be maximized in the center of the billet or another region of the billet as chosen by the operator. As a result of this capability, a further object of the invention is to increase the volume which can be processed through an engineered wood press due to the press time being decreased by the use of the microwave heating system of the invention.

DISCLOSURE OF INVENTION

According to the present invention, the foregoing and other objects and advantages are attained by a system for producing dimensioned material such as engineered wood products, using a fibrous component and a binder material. The fibrous component can be various types of wood, plant or non-organic fibers in various lengths, orientation, and piece sizes. The binder material can be any material which hardens as it cures, and whose curing rate is accelerated by heat. Urea formaldehyde resin is commonly used, but other binding material, such as cross-linking polyvinyl acetate resin, melamine urea formaldehyde resin, resorcinol phenol formaldehyde resin, aliphatic and polyvinyl acetate resin emulsion adhesives, or other resins whose hardening is accelerated with heat can also be used. The fibrous components in the binder material are organized into a billet, typically in alternating layers, and microwaves are utilized to heat the center regions of the billet before the billet is placed in a press for pressing. The billet is illuminated with a traveling wave of microwave energy which is absorbed as it passes through the billet, and then is reflected back into the billet, where more energy is absorbed as it passes all the way through the billet again and the remaining wave energy is sensed upon exiting the billet. The reflected energy from the incident wave and all other reflections from veneer and glue layers are combined, and the combined reflected energy is measured by sensors. Tuners are used to generate an induced reflection which cancels the reflected energy. This system includes one or more microwave sources for illuminating and heating the billet before it enters the press. It also includes one or more wave guide networks for guiding a microwave traveling wave from the microwave source to the billet. The system also includes one or more mode converters which convert rectangular waveguide mode to circular magnetic mode microwave energy. The system also includes one or more circular magnetic mode microwave applicators. The system also includes microwave reflecting surfaces which are placed on the opposite side of the billet from the point of entry of the microwaves into the billet. The reflecting surfaces reflect the microwave traveling wave which exits an opposite side of the billet, directly back into the billet. The system also includes one or more sensors of microwave energy for measuring the microwave energy which is passed through the billet after being reflected, as well as other reflected microwave energy. These sensors of microwave energy report the energy measured to a computer tuning system.

The system also includes a computer tuning system which uses the reported microwave energy which is measured by the sensors of microwave energy, to calculate adjustments required to reduce the amount of reflected microwaves passing back toward the microwave source to approximately zero. This system also includes a means of tuning the microwaves based on a signal from the computer tuning system. Lastly, the system includes a press with platens which press the layers of the fibrous component in the binder together, and hold them together while the resin finishes curing.

The system described above can be designed such that the microwaves are the only source of heat applied to the billet. The system can also be designed so that a supplemental heat source is utilized to heat the billets while they are in the press. The supplemental heat applied to the billets in the press can be microwave energy applied to the billet normal to the longitudinal axis of the billet. This system can also be designed such that the supplemental heat applied to the billet while it is in the press is by the application of microwave energy to the side or sides of the billet, parallel with the glue lines. The means of supplying supplemental heat to the billet while it is in the press can be from circular magnetic mode microwave energy. The means of supplying supplemental heat to the billet while it is in the press can also be by heating the platens of the press and using conduction to transfer heat from the platens to the layers of the billet.

This system can be designed so that the means for tuning the microwaves generated is one or more capacative probes which are activated by a signal from the computer tuning system and which allow the computer tuning system to control the phase of the applied microwave. The capacitive probes induce reflections which are opposite in phase and equal in magnitude to the reflected microwave energy. The system can utilize microwave reflecting structures to compensate for microwave reflections by other parts of the system.

In accordance with another aspect of the invention, the invention is an apparatus for generating heat in a billet. The billet, as in the previous embodiment, consists of a fibrous component and a binder material which cures and whose rate of curing is accelerated by heat. The billet is pressed in a press while the binder material cures. Heat is generated in the billet by illuminating the billet with a traveling wave of microwave energy which passes through the billet, is reflected back into the billet, is sensed, and is tuned to cancel reflected microwave energy.

This apparatus consists of one or more microwave sources for illuminating the billet, and one or more wave guide network for guiding a microwave traveling wave from the microwave source to the billet. It also includes one or more mode converters which convert rectangular waveguide mode to circular magnetic mode microwave energy. It also consists of a number of circular magnetic mode microwave applicators. It also consists of microwave reflecting surfaces for reflecting the microwave traveling wave which has passed through a billet and exited an opposite side directly back into the billet. It also consists of one or more sensors of microwaves for measuring the microwave energy which is passed through the billet after having exited the billet and being reflected back into the billet. These sensors report the energy measured to a computer tuning system. The apparatus also includes a computer tuning system which uses the reported microwave energy which is measured by the sensors, to calculate adjustments required to reduce the amount of reflected microwaves passing back toward the microwave source to approximately zero.

The apparatus also includes a means for tuning the microwaves generated based on a signal from the computer tuning system. The apparatus for generating heat in a billet can be configured so that the microwave energy is applied normal to the longitudinal plane of the billet or parallel to the transverse axis of the billet. The means of tuning the microwaves generated can be one or more capacitive probes which are activated by a signal from the computer tuning system. This apparatus for generating heat in a billet can be located outside the press so that the billet is heated before it enters the press. The apparatus for generating heat in a billet can also be located inside the press, so that the billet is heated while it is under pressure in the press.

Still another aspect of the invention is a method for making dimensioned material, such as engineered wood products, using a fibrous component and a binder material. The fibrous component can be wood, plant, or other fiber of various size, lengths and thicknesses. The binder material can be any one of a number of binder material whose curing is accelerated by the application of heat. The fibrous component and the binder material are typically arranged in layers to form a billet. The billet has a center, a longitudinal and transverse axis. The method consists of combining the fibrous component and the binder material into a billet; illuminating the billet with a traveling wave of microwave energy from a microwave source and which is conducted along a rectangular wave guide network as rectangular waveguide mode microwave energy, converting the microwave energy from a rectangular waveguide mode to circular magnetic mode using a mode converter; illuminating the billet with a traveling wave of circular magnetic mode microwave energy; reflecting the traveling wave of microwave energy back into the billet after it has passed through the billet; sensing the reflected microwave energy which travels toward the source of microwave energy; using tuning probes to cancel the reflected microwave energy by induced reflections of an opposite phase and equal magnitude; passing the billet through the microwave energy field in a continuous motion; passing the billet through a press which applies pressure to the billet for a period of time during which the binder material completes curing; and passing the billet out of the press.

This method utilizes microwave sensors which are located in the wave guide. The microwave energy is tuned by inducing reflections by the use of tuning probes which equal and cancel the reflected microwave energy. Using circular magnetic mode microwaves can be the sole source of heat in a system, or it can be used in conjunction with supplemental heat which is applied to the billet while it is in the press. The supplemental heat applied to the billet when it is in the press can be in the form of microwave energy, or it can be supplied by heating the platens of the press and allowing the heat to be conducted from the platens into the billet.

The method and apparatus of the invention, using microwave energy which passes through the billet, is reflected back into the billet, is sensed, and the microwave energy tuned to reduce the reflected microwave energy to approximately zero, thus optimizes the use of energy to heating a billet of fibrous material and binder material to be pressed into dimensioned material, such as engineered wood products. If used in a preheating step before the billet enters a press, the microwave energy heats the billet to a temperature which is optimal for curing in the press and which decreases the amount of heat necessary to be applied to the billet while it is in the press. Since the microwave energy is applied by a number of microwave applicators normal to the longitudinal plane of the billet, a billet of any width can be accommodated. Since the energy is applied normal to the plane of the glue lines, the danger of arcing or tracking of the energy through the glue lines is reatly reduced. Since the energy is applied through a number of tuning systems which are being continually adjusted for optimal energy delivery as the billet travels through the microwave heating apparatus, this apparatus accounts for variations in density, moisture content of the material, moisture content of the binder, and other variables in the billet to deliver a uniform distribution of heat to the center of the billet.

Still other objects and advantages of the present invention will become readily apparent to those skilled in this art from the following detailed description, wherein I have shown and described only the preferred embodiment of the invention, simply by way of illustration of the best mode contemplated by me of carrying out my invention. As will be realized, the invention is capable of modifications in various obvious respects, all without departing from the invention. Accordingly, the drawings and descriptions are to be regarded as illustrative in nature, and not as restrictive.

BEST MODE FOR CARRYING OUT INVENTION

Figure 1:
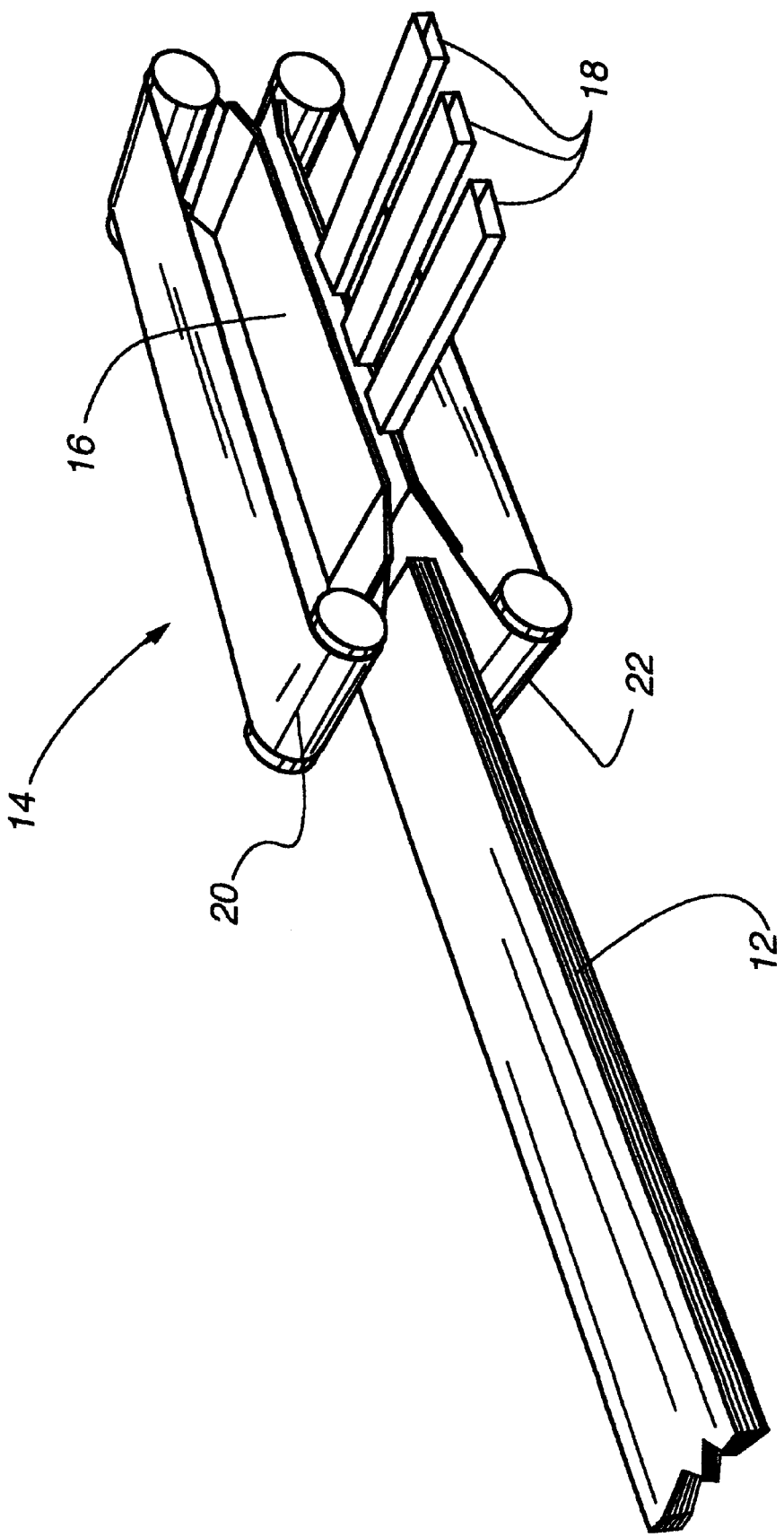
FIG. 1 is a perspective view of a prior art press with provisions for side application of microwave energy to the billet in the press.
Figure 2:
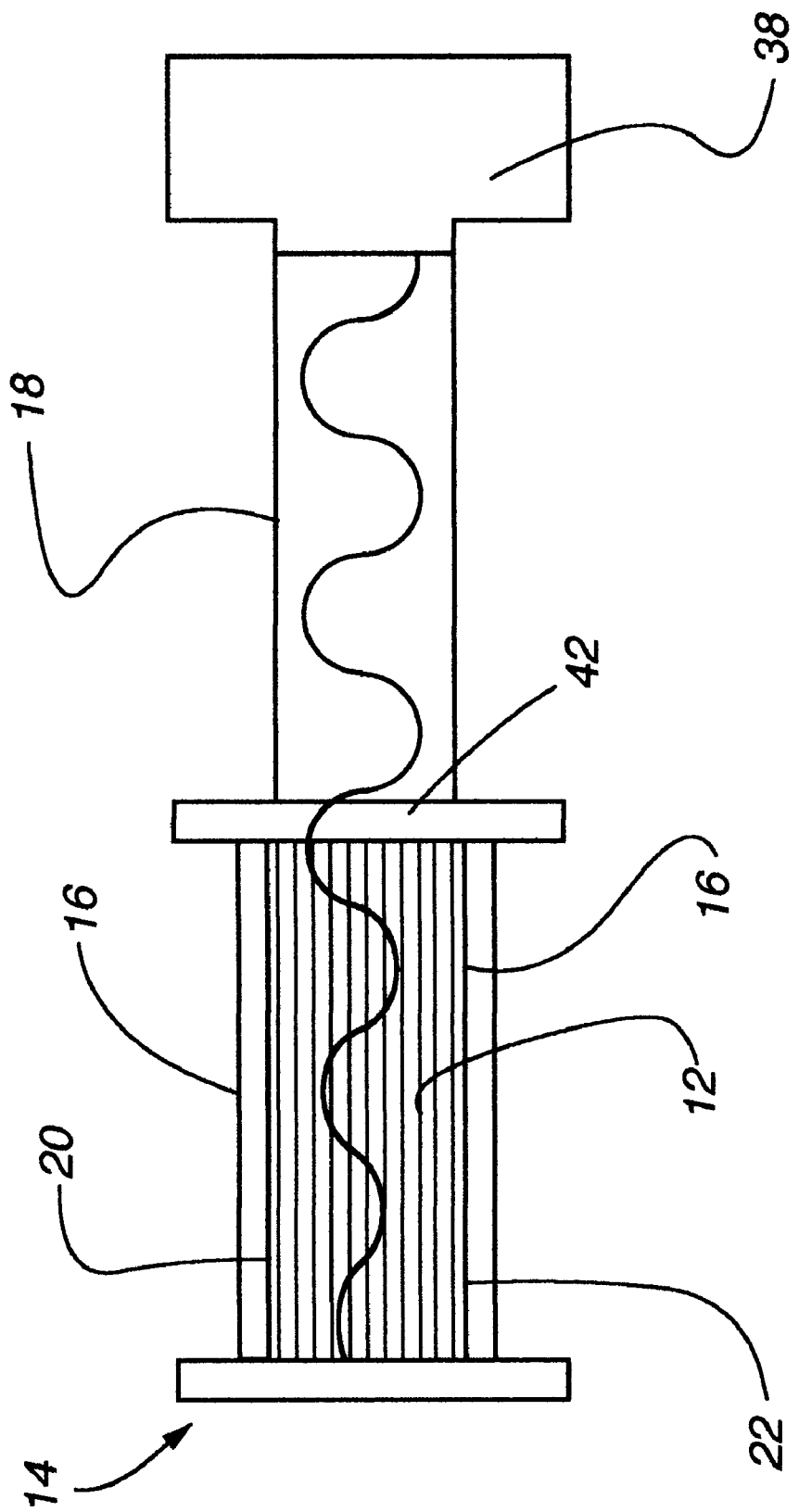
FIG. 2 is a side cross-sectional view of a prior art microwave source, wave guide, and billet in a press.

Referring to FIGS. 1 through 12, the invention is shown to advantage. FIG. 1 shows a simplified view of a prior art system for gluing veneer strands together to form engineered wood using the application of microwave energy while the work piece is in a press 14. Although the work piece 12, which hereinafter will be referred to as a billet, could be of any thickness, in-press heating with microwave energy is best suited for thicker billets, to utilize the characteristic of microwaves to penetrate and heat the center of a billet. In the prior art, the billet 12 is composed of layers of wood strands and glue (also known as binding material or adhesive). The billet enters a press 14 which consists of an upper continuous belt 20 and a lower continuous belt 22. The two belts are brought together in the press platen 16, which applies pressure to the billet. As shown in FIG. 2, while the billet 12 is in the platen 16 of the press 14, microwave energy from a source 38 is directed into rectangular wave guide 18. The microwave energy enters the press 14 through window 42 which is transparent to microwave energy, but which can withstand the pressure exerted by the press. The microwave energy heats the center of the billet, and hastens the hardening, or curing, of the glue. After an appropriate time at a required temperature and pressure, the billet 12 exits the press 14.

Figure 3:
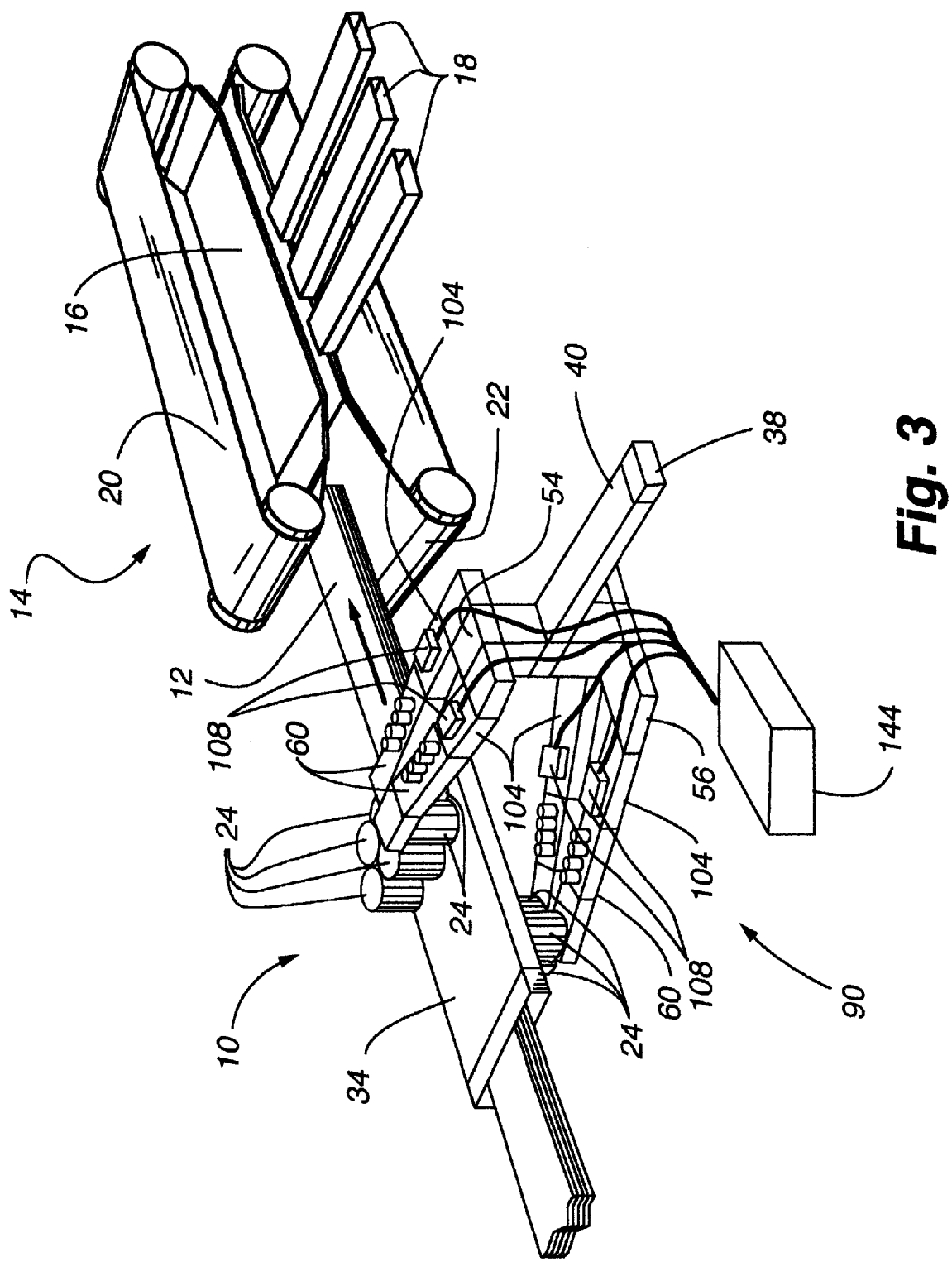
FIG. 3 is a perspective view of a prior art press with the pre-heating system of this invention.

FIG. 3 shows a simplified view of the invention. The engineered wood manufacturing system of the invention includes a microwave source 38, wave guide straight sections 40, wave guide elbows 56, and wave guide tees 54. These wave guide components can be of any conductive material, but will typically be of aluminum. These comprise a wave guide network 90 which utilizes conventional technology components to carry microwave energy in the form of rectangular waveguide mode microwave energy from the microwave source 38 to applicators 24. Each wave guide source 38 supplies energy through a wave guide network 90 to a pair of applicators 24 above the heating chamber 34 and a pair of applicators below the heating chamber 34. Thus, three microwave sources 38 would be required to energize 12 applicators 24. Other configurations of sources 38 to applicators 24 are of course possible while practicing the invention.

Figure 4:
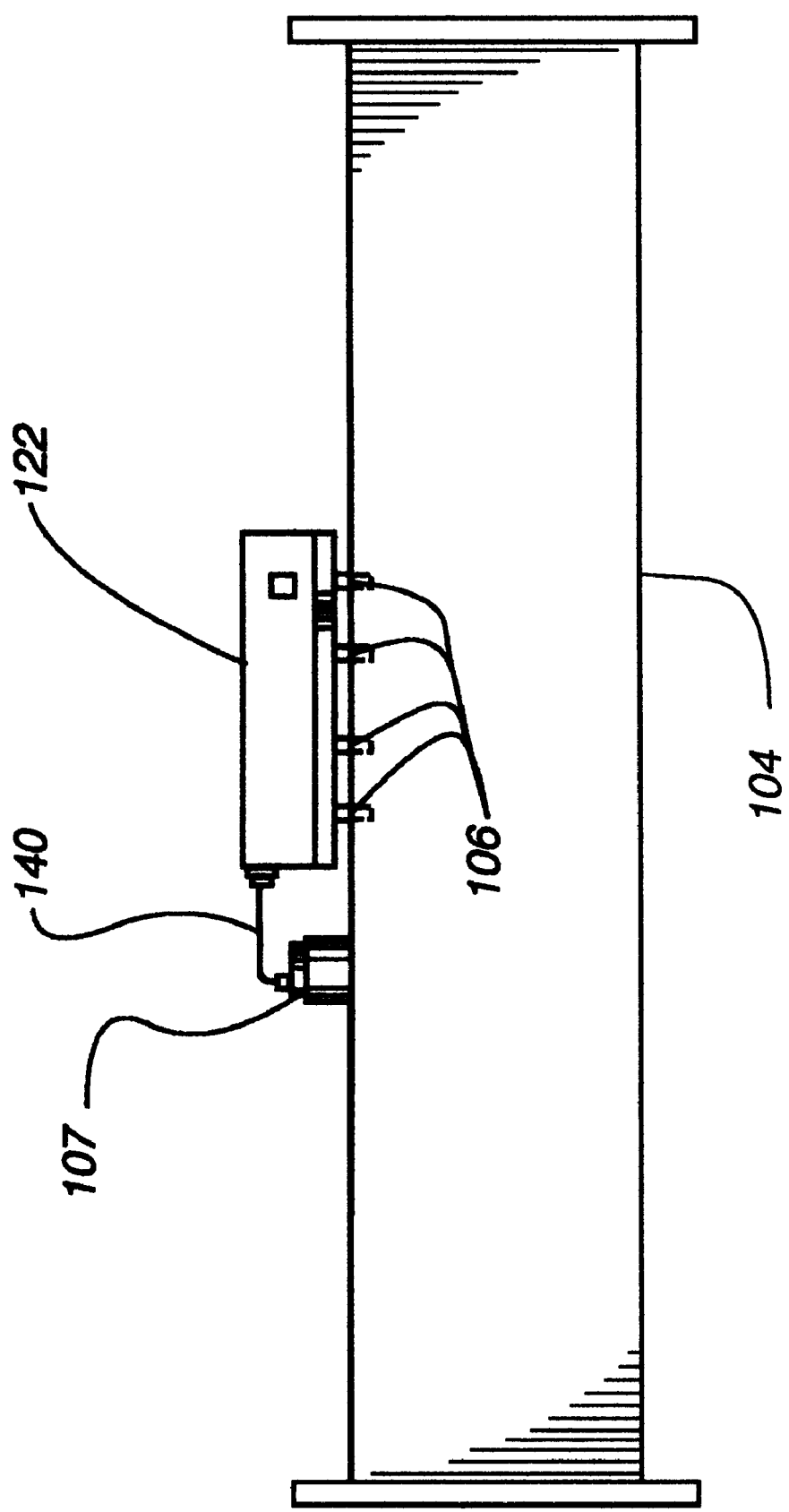
FIG. 4 is a side cross-sectional view of a sensing section.

Incorporated into the wave guide network 90 is a sensor section 104 and a signal directional sensor 107. Each sensor section 104 contains four microwave sensors 106, as shown in FIG. 4. These are conventional technology sensors. They generate a signal which is routed to a computer 108 (FIG. 5), which in the best mode of the invention is mounted on sensor section 104. The sensors 106 are placed in the sensor section 104 such that the reflection phase displacement along the wave guide is 90 degrees in reflection.

Figure 13:
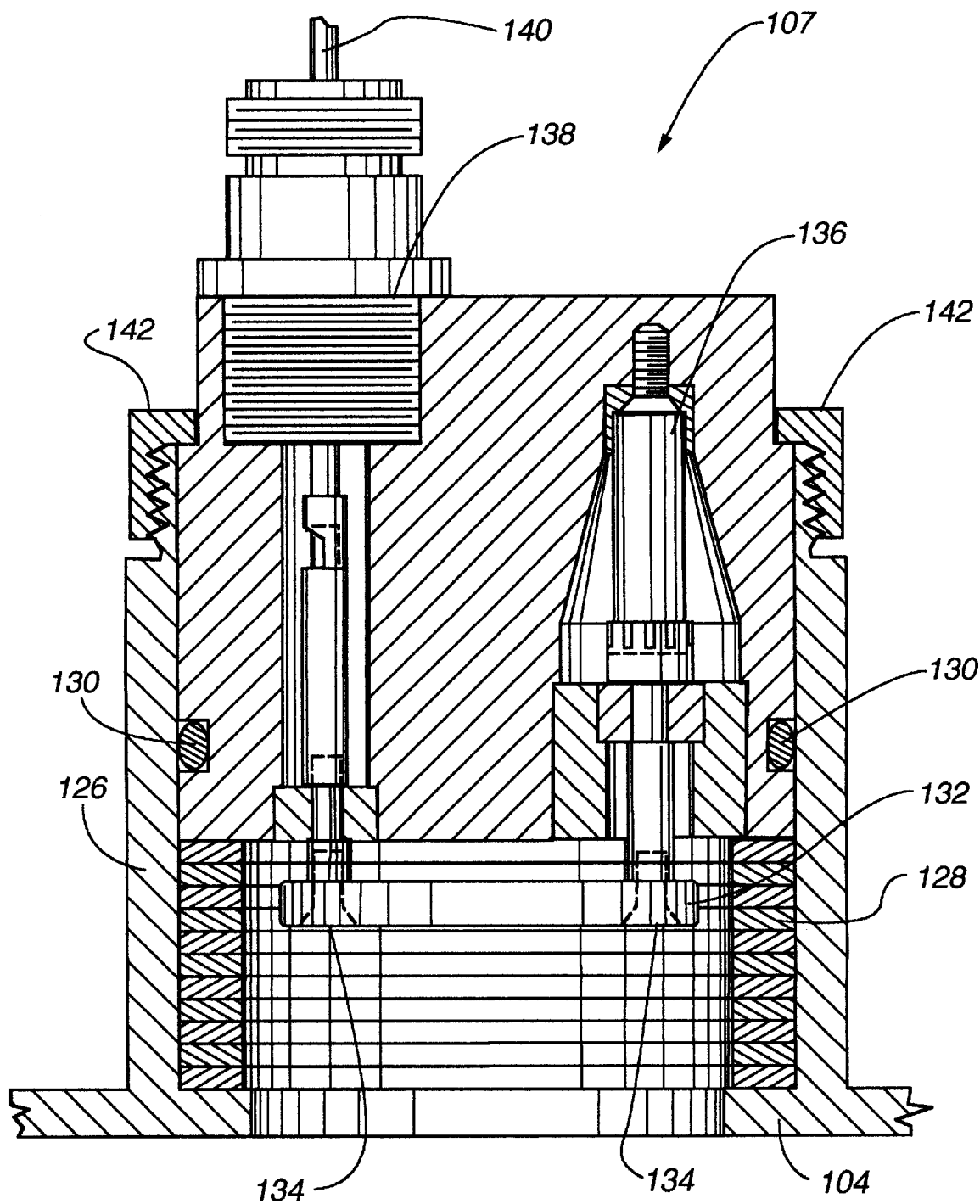
FIG. 13 is a cross sectional view of a signal direction sensor.

Signal direction sensor 107 is a cylindrical shaped sensor which fits inside a cylindrical shaped housing 126. Housing 126 joins sensor section 104 and surrounds a hole in the sensor section wall, as shown in FIG. 13. Spacers 128 ride on the a lip of sensor section 104 which is surrounded by housing 126. Signal direction sensor 107 rests atop a number of spacers 128. An O ring 130 seals the gap between the housing 126 and the signal direction sensor 107. Signal direction sensor 107 includes a loop 132, two screws 134, a dissipative resistor 136, a signal detector, an output cable, and a ring cap. The signal direction sensor 107 is mounted between the microwave source 38 and the sensors 106.

Figure 5:
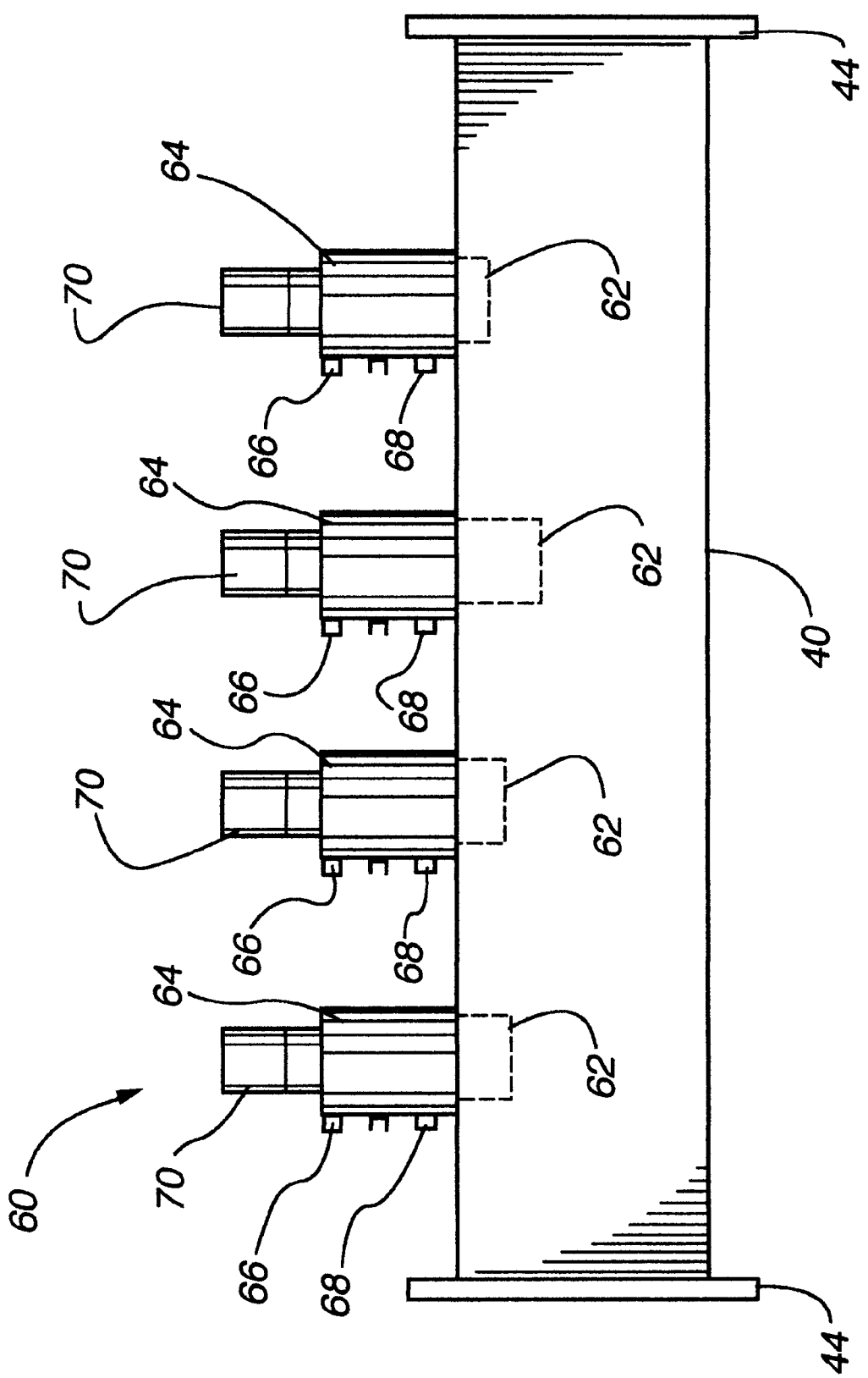
FIG. 5 is a side cross-sectional view of a tuning section.

Mounted on the opposite side of the sensor section 104 from the microwave source 38 is a tuner section 60. Tuner section 60 includes four field divergent capacitive probes 62, which will be hereinafter referred to as tuning probes 62, which are spaced 8.06 inches apart. FIG. 5 shows tuning section 60 and tuning probes 62. Tuning section 60 is 54 inches long. Tuning probes 62 extend 0–3 inches into tuning section 60. Tuning probes 62 are made of silver plated brass.

Figure 6:
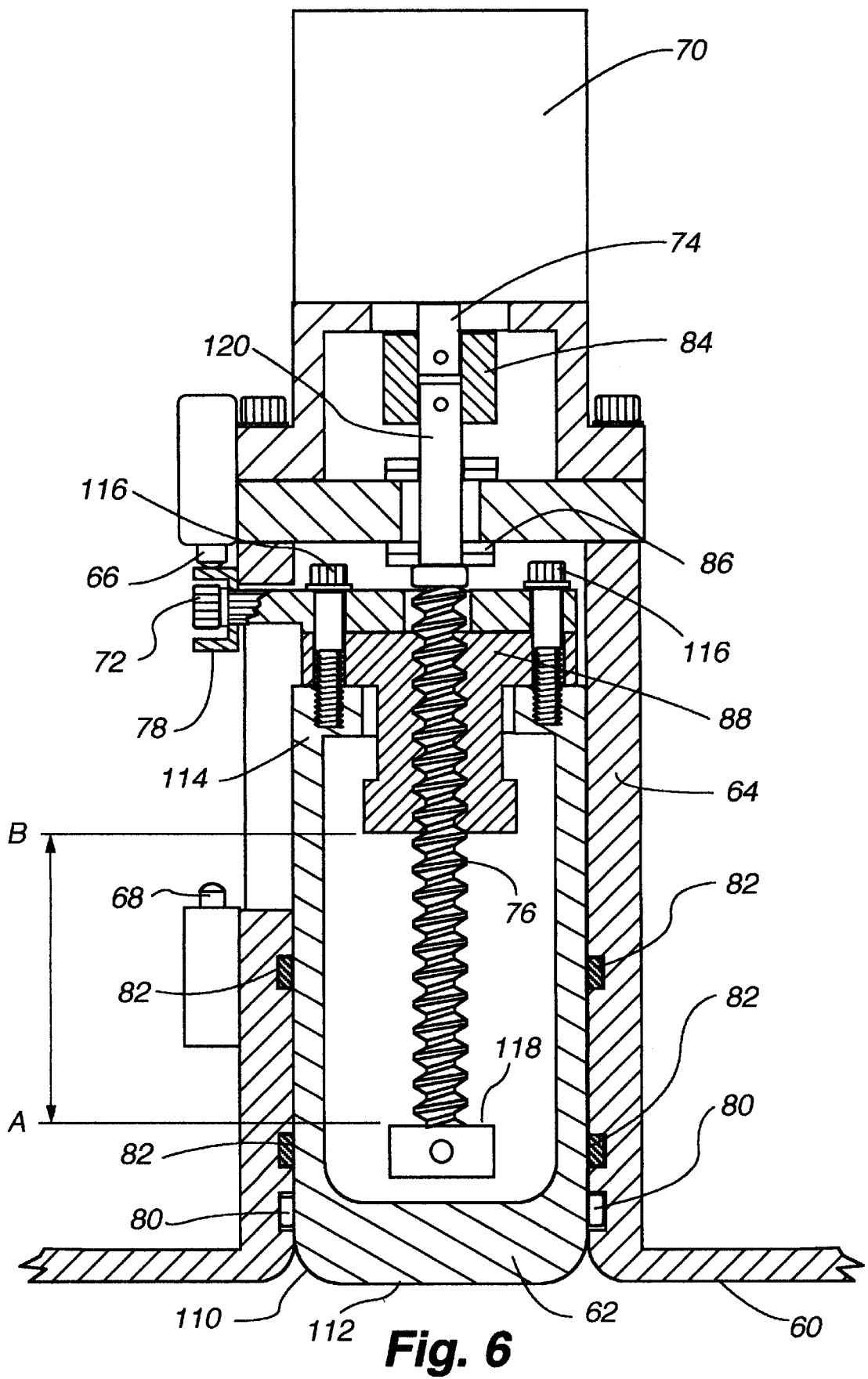
FIG. 6 is a side cross-sectional view of a tuning probe.

Tuning probe 62 is a cylindrical structure with a first end 112, a second end 114, and rounded corners 110, as shown in greater detail in FIG. 6. The first end 112 of tuning probe 62 can also be more rounded in shape, approaching a hemispherical shape. Tuning probe 62 is surrounded by probe housing 64.

At the second end 114 of the tuning probe 62 is a threaded base 88, which is attached to tuning probe 62 by screws 116. Anchor post 118 attaches to the inside of tuning probe 62 at its first end 112. Attached to anchor post 118 is screw 76. Screw 76 is threaded through threaded base 88, passes through thrust bearing 86, and ends in shaft 120. Shaft 120 attaches through coupling 84 to motor shaft 74. Motor shaft 74 extends from stepper motor 70.

Each tuning probe 62 further includes an upper limit switch 66 and a lower limit switch 68, also shown in FIG. 6. Between the limit switches is a limit switch activator 72.

Between the tuning probe 62 and the probe housing 64 are located Teflon® slide bearings 82, and sliding ground contact 80.

Figure 7:
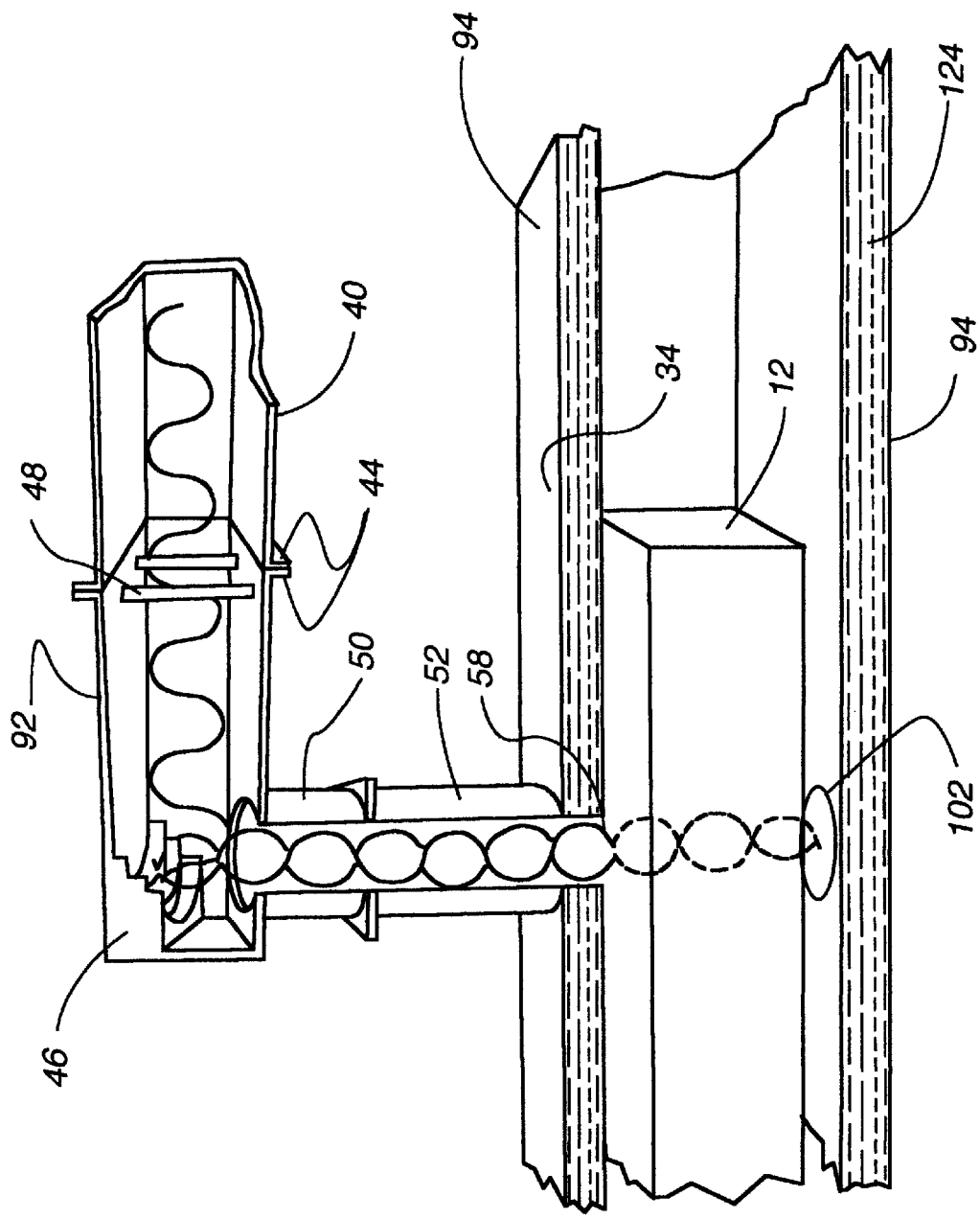
FIG. 7 is a perspective cross-sectional view of a microwave source, wave guide, microwave applicator, and a billet in a pre-heating chamber.

After the tuning section 60, the wave guide straight sections 40 attach by flanges 44 to a mode converter section 92. The interior detail of mode converter section 92 is shown in FIG. 7. Within the mode converter section 92 are located compensating structures 48, which are cylindrical structures typically of aluminum, though other conductive material is also suitable. Also within mode converter section 92 is located circular magnetic mode converter 46, which will be referred to as mode converter 46. Mode converter 46 is a three stepped structure, with each step having a curved surface. In the best mode, the mode converter 46 is 9.75 inches wide, and 4.88 inches tall. Each step is 1.62 inches in height, with a 5.5 inch radius to the curve. Directly below mode converter 46 and attached to mode converter section 92 is an output section 50. This in turn is attached to circular section field formation tube 52. Circular field formation tube 52 is 40 inches tall and like output section 50, is 11 inches in diameter. Circular section field formation tube 52 is in turn attached to heating chamber 34. At the interface of circular section field formation tube 52 and heating section 34 is a Teflon® window 58. Each circular section field formation tube when joined to an output section 50 comprises an applicator 24.

Heating chamber 34, shown in FIG. 7, is a generally rectangular chamber through which the billet 12 passes before it reaches the press 14. Another preferred embodiment of the invention uses the microwave system of the invention to apply microwave energy to a billet 12 while it is in the press 14 and under pressure.

Heating chamber 34 is surrounded by water tank 94, which serves as an absorber of microwave energy which is scattered from the heating chamber 34. Water tank 94 is filled with a water solution which is routed to a radiator (not shown). Heating chamber 34 has a first aperture 96 through which billet 12 enters the heating chamber 34. Heating chamber 34 also has a second aperture 98 through which billet 12 exits the heating chamber. Surrounding the first and second apertures 96 and 98 are three quarter wave guide wavelength wave traps 100. These are generally rectangular sections which are open on the side facing the billet 12, but which are closed on all other sides. Each wave trap 100 is short circuited at a distance equaling three quarter wave guide wavelength from the open end.

On the side of the heating chamber 34 opposite each applicator 24 is a reflecting surface 102. This is a flat surface which reflects microwave energy. Other preferred embodiments of the invention utilize reflecting surfaces which are curved to focus or diffuse microwave energy, or which are adjustable in position and shape.

In operation, a billet 12 is formed by successive layers of veneer and glue. These enter heating chamber 34 on a continuous belt (not shown) which is transparent to microwave energy, and the billet 12 is also a continuous piece. As the billet passes in a continuous motion through heating chamber 34, microwave energy is directed through the billet from above and below, as shown in FIG. 3. This microwave energy originates from a number of microwave sources 38, preferably one microwave source for each four applicators 24. The microwave energy passes through a wave guide network 90, through sensor section 104 and through tuner section 60, and reaches mode converter section 92, shown in further detail in FIG. 7. Within mode converter section 92, the microwave energy encounters mode converter 46, which converts the microwave energy from rectangular waveguide mode ($TE_{10}$) to circular magnetic mode ($TM_{01}$) microwave energy. Although the best utilizes circular magnetic mode energy to heat the billet 12, other modes of microwave energy are possible for use by this system. These other modes could include an evanescent field. Inherent in the encounter of microwave energy with mode converter 46, reflections of microwave energy occur, and these reflections travel back toward the microwave source 38. These are canceled out by equal and opposite wave patterns set up in the microwave path by compensating structures 48.

After exiting the mode converter section 92, the microwave energy travels through the output section 50 and into the circular section field formation tube 52. The output section 50 acts as a Fresnel field suppression section. This section allows the Fresnel fields that are high in strength in the direct vicinity of the mode converter 46 to fall off as the microwaves, now in the new symmetrical circular magnetic mode, travel toward the heating chamber 34. As it exits the circular section field formation tube 52, the microwave energy enters the heating chamber 34 in a circular magnetic mode. In this mode, the microwave energy enters the heating chamber 34 and the billet 12 within the heating chamber 34 as an incident wave with two separate electric field components that are oscillating at the operating microwave frequency. This exposes the billet 12 to electric fields in two axes, one axial, or along the axis of travel of the incoming microwave signal, and one radial, from the center of the applicator 24.

Figure 9:
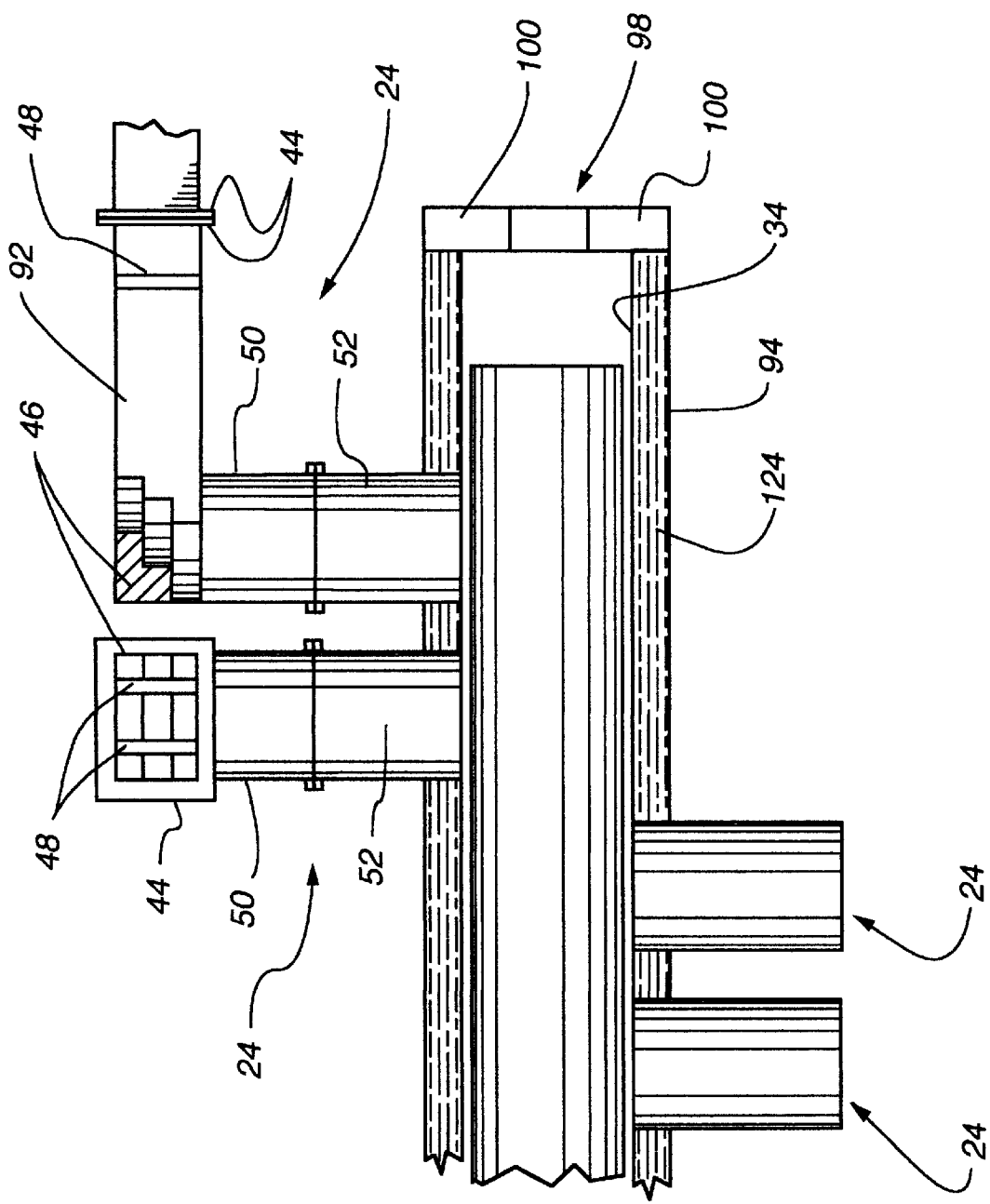
FIG. 9 is a cross-sectional side view of the pre-heating chamber.
Figure 10:
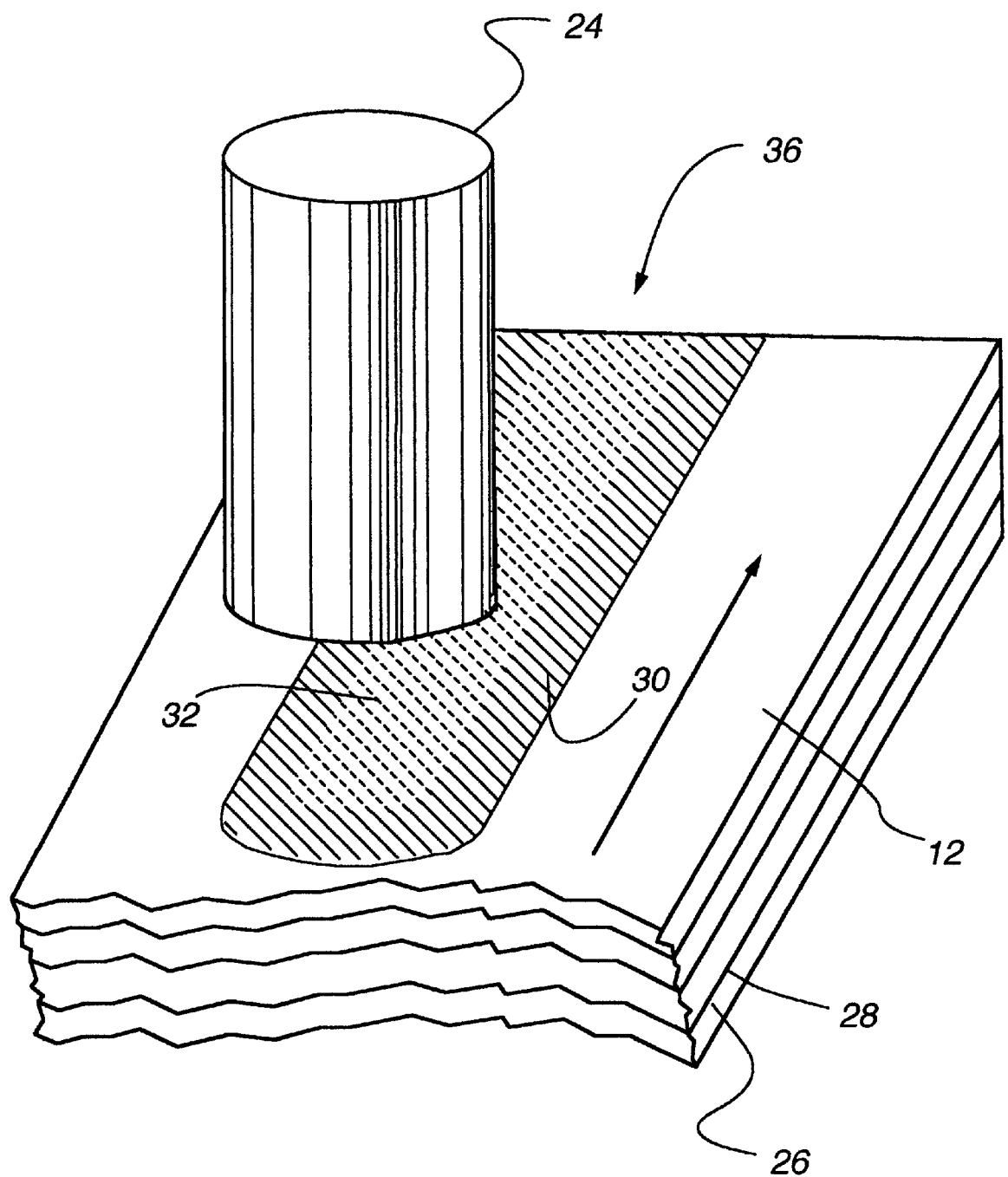
FIG. 10 is a perspective view of a microwave applicator showing its heat distribution pattern on the face of the billet below.
Figure 11:
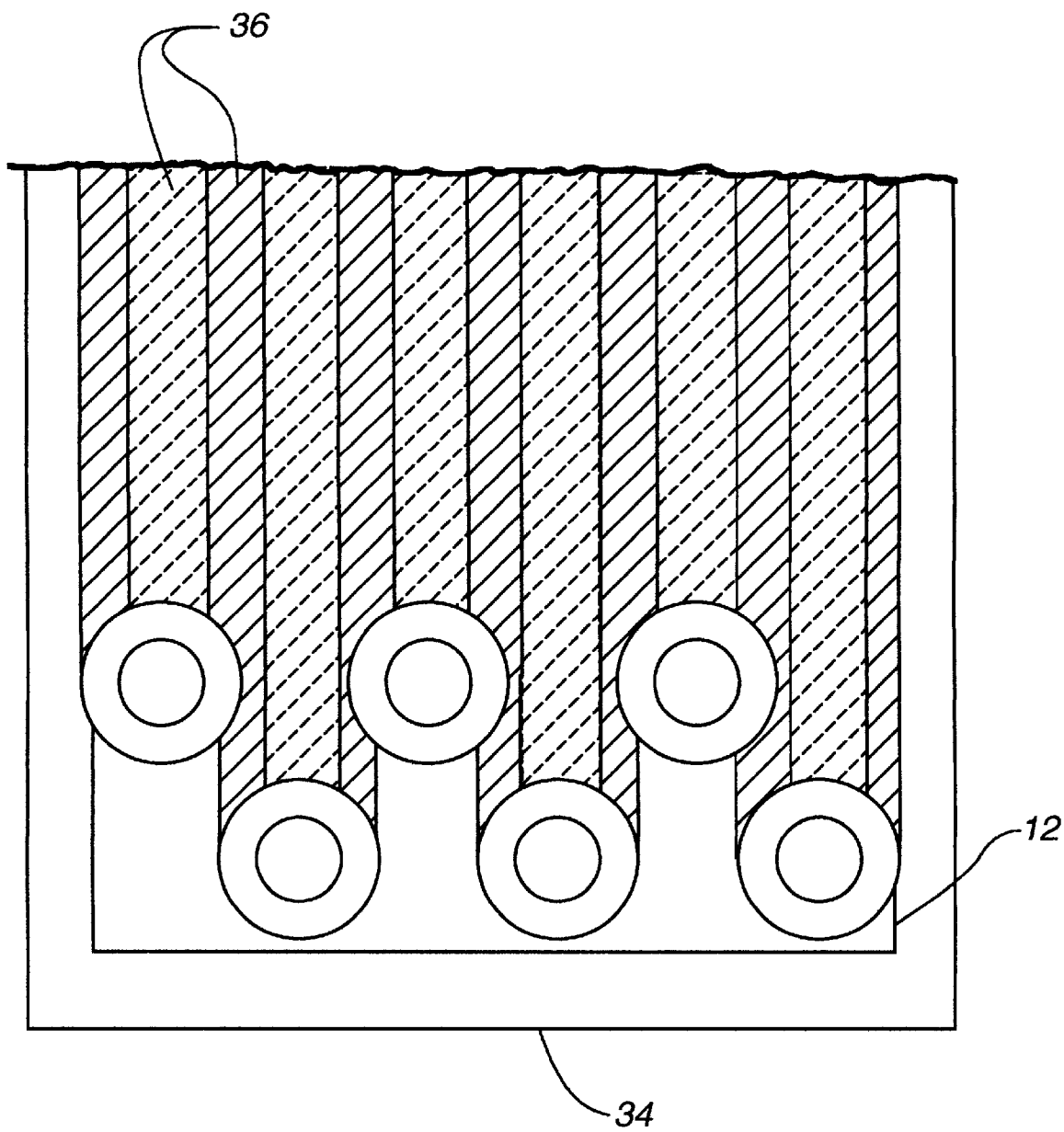
FIG. 11 is a top view of six microwave applications showing the interaction of their heating tracks.
Figure 12:
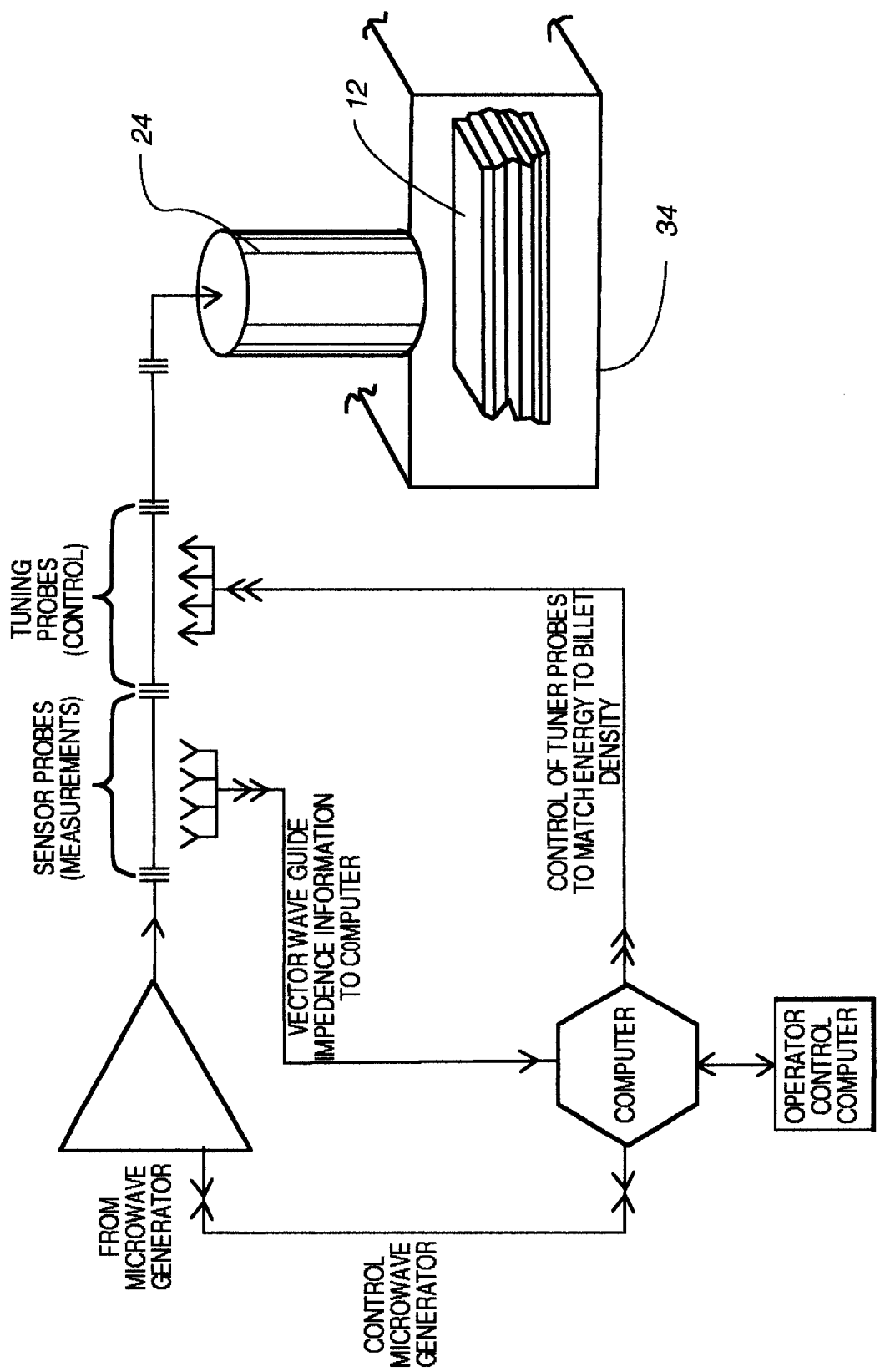
FIG. 12 is a schematic showing the tuning system.

This system exposes the billet 12 to a system of fields that are highly efficient in converting the energy of the microwaves into heat, which is produced in the billet. This dual field illumination of the billet 12 also minimizes arcing and tracking paths along the glue lines, which is a problem with microwaves applied along a single axis parallel with the glue lines of a billet 12. Further, since this microwave energy is directed normal to the longitudinal axis of the billet 12, the width of a billet 12 is not limited by the limits of penetration of microwave energy from the side of the billet. FIG. 9 shows the arrangement of banks of applicators 24 above and below the billet 12. The applicators 24 positioned above the billet 12 in FIG. 9 show a cross section and an end view of the mode converter section 92. FIG. 10 shows the heating track 36 which results from a billet moving through the outer heating zone 30 and the inner heating zone 32 which is projected from applicator 24. FIG. 11 shows the heating tracks 36 on billet 12 which result from a bank of six applicators 24. In the preferred mode, the applicators 24 are spaced with their center point 8.57 inches apart, with a first group of three applicators 24 set with centers 15 inches from the centers of another group of three. The first group of three applicators 24 are spaced with their centers 7½ inches from the end of the heating chamber 34, which itself is 60 inches wide. A similar bank would be positioned on the opposite side of the billet. In the best mode of the invention, the maximum width of a billet 12 would be slightly narrower than the outside edges of the outside applicators 24. Although a bank of six applicators is shown, there is no limitation on the number of applicators which could be used. To heat a wider billet 12, banks of 8, 10 or more applicators are possible.

As the incident microwave energy from the applicator 24 passes through the billet 12, some is absorbed in the billet 12 and some passes through the billet 12. The microwave energy which passes through the billet 12 strikes a reflecting surface 102 mounted below the billet 12 which can be on the top of the bottom surface of the heating chamber 34, as shown in FIG. 7. The reflecting surface 102 reflects the incident microwave energy directly back into the billet 12 as a reflected wave, where it again passes through the billet. The incident and reflected waves form a standing wave located within the billet 12, and heat the water within the wood of the veneer and glue layers. The superposition of the incident and reflected waves results in an interference pattern of standing waves that are positioned in between the applicator 24 and the reflecting surface 102. This pattern of standing waves will result in increased electric field strength inside the billet 12 assembly due to the electric field vectors, one incident from the applicator 24 and the other launched from the reflecting surface 102, adding constructively. Maximum loss, and hence, best microwave match to the billet 12 assembly will occur when maximum electric field is present where the high microwave losses are, which is at the center of the billet 12.

As the incident microwave energy exits the applicator 24, is passes through a number of planes which cause reflections. The first such plane is when the microwave energy enters the heating chamber 34. The next reflection plane is the first layer of veneer, followed by the first glue line. Each layer of veneer and glue causes further reflections, and each reflection wave itself results in smaller reflections as they pass through the veneer and glue layers. Since each of these reflected waves has an associated magnitude and phase, which is the microwave equivalent of strength and direction, the reflections combine vectorally and either add to each other or cancel each other out. The summed reflection wave from all the reflection surfaces, including the reflected wave which resulted from the incident wave passing through the billet and being reflected from the reflecting surface, travels back through the applicator 24, through the mode converter section 92, and through the tuning section 60 and into the sensor section 104 in a direction opposite to that of the incident wave. This summed reflected wave is sensed and tuned as shown in schematic in FIG. 12. Since each applicator 24 has its own sensing section 104 and tuning section 60, each applicator can be individually and independently tuned to adjust to changes in reflections caused by changing density of wood or water content under a particular applicator.

In the sensor section 104 the sensor probes 106 detect the phase and magnitude of reflected microwave radiation reaching the sensor section 104. The sensor probes 106 are placed in the sensor section 104 such that the reflection phase displacement along the wave guide is 90 degrees in reflection. These sensors provide complete vector representation. The sensor probes 106 are spaced exactly one-eighth wave guide wavelength at the operating frequency of the system. Information from all four sensor probes 106 is sent to computer 108. The computer 108 uses input from the four sensor probes 106 to determine the vector reflection coefficient.

Based on this information calculated individually for each applicator 24, the computer 108 calculates the needed phase and magnitude needed to completely counteract the reflected energy, and sends a signal to the stepper motors 70 of each applicator. The stepper motor turns the shaft 74 and the attached screw 76 moves the tuning probe 62 in or out of the tuning section 60. As the tuning probe 62 is extended into the tuning section 60, it introduces capacitive discontinuities, which could also be called an induced reflection. Since the tuning probes 62 are also spaced at 90 degrees phase displacement at the center operating frequency, their adjustment can result in setting up a standing wave pattern that will result in an induced reflection which will sum with all the other reflections and cancel them out. The induced microwave reflection is opposite in phase and equal in magnitude to the reflected microwaves. In this way the reflected energy is eliminated, and all the energy of the microwave is utilized to heat the billet 12. Due to real time adjustments of the induced reflection, irregularities in the wood density, water content, glue thickness, and glue water content are compensated for, and uniform and efficient heating is achieved and maintained. This allows for veneer layers with more variation in moisture content to be processed without pre-drying.

An additional benefit in the use of the sensing system is the option of its use as a quality monitor. Any sudden change in sensed data would alert the operator to a condition which should be investigated. A computer 144 is provided for this purpose. Computer 144 (see FIG. 3) connects to each computer 108 on each sensing section 104 by optic fiber cable.

Between the microwave source 38 and the sensors 106 is located a signal direction sensor 107, which is shown in FIG. 13. This device is built to sense microwave power levels coming from one direction only, and senses the power level coming from the microwave source 38. The loop 132 of the signal direction sensor 107 senses both electric and magnetic waves from the microwave signals in the waveguide. These signals combine as vectors at both ends of the loop. The vectors are equal in magnitude and opposite in direction at one end of the loop, and equal in magnitude and equal in direction at the other, depending on the direction of travel of the microwaves in the waveguide that the sensor is connected to. The signals that are in the unwanted direction, from the heating chamber 34, are diverted to the dissipative resistor 136, and are dissipated. The signals that are in the desired direction, from the microwave source 38, are channeled to the detector 138, and through the output cable 140 to the computer. The computer uses the sensed power level of the microwave source 38 as one piece of information to use in calculating the tuning signals which are required for the tuning probes 62. Since the signal direction sensor 107 is sensitive to the flow of microwave energy in one direction only, it is not affected by the interference pattern of standing waves created by the superposition of the two waves traveling in opposite directions.

Some of the microwave energy which enters the heating chamber 34 is reflected away from the billet. Three mechanisms are in place to prevent the escape of any of these reflected microwaves. As shown FIG. 8, the heating chamber 34 is surrounded by a water tank 94. The walls of the water tank 94 are of a material which is transparent to microwave energy, such as high density polyethylene. The fluid 124 in water tank 94 is an aqueous solution preferably containing propylene or ethylene glycol. The fluid 124 in the water tank 94 is routed to a conventional radiator (not shown), to dissipate any heat which is generated in the fluid 124.

Figure 8:
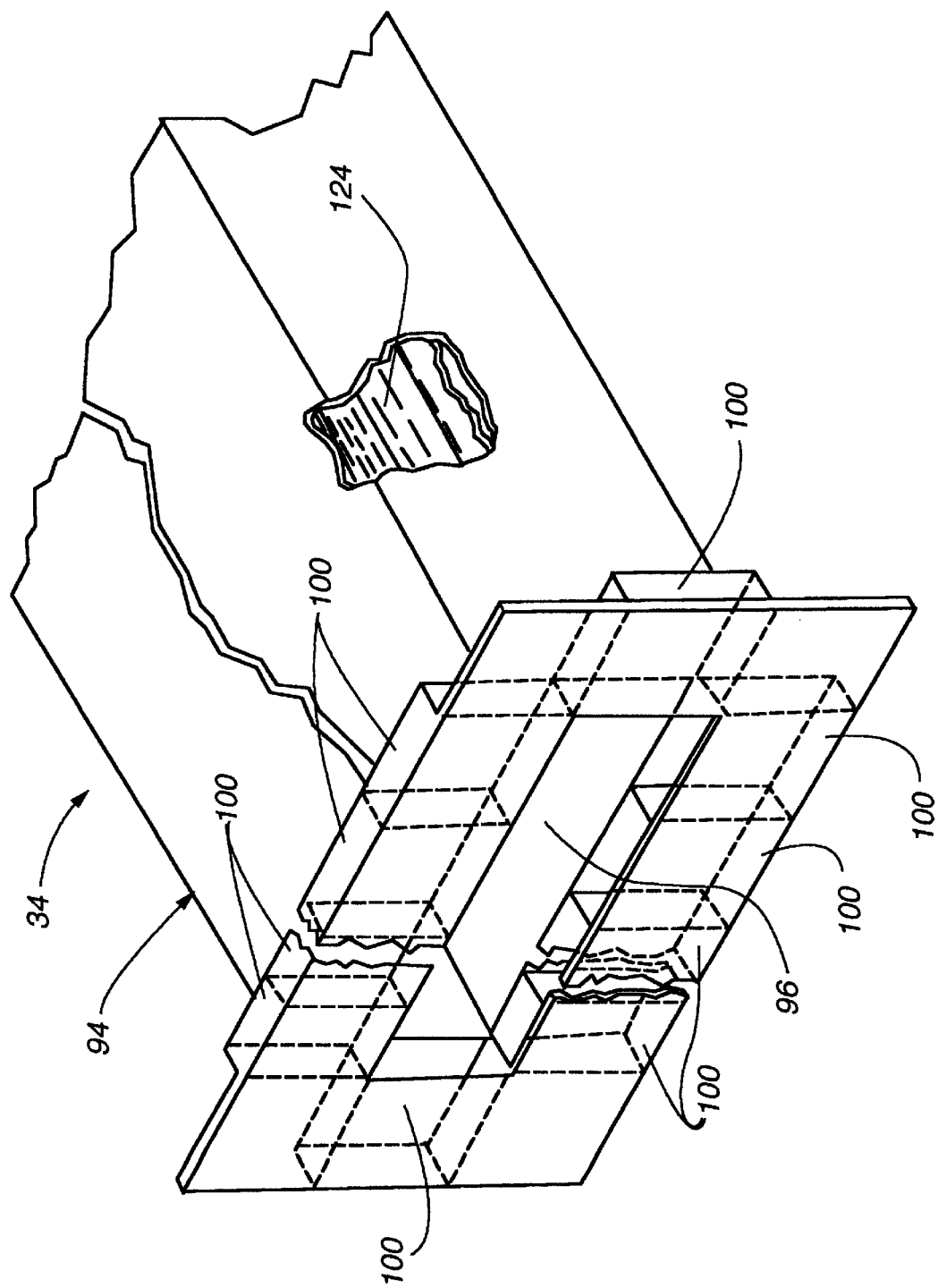
FIG. 8 is a cross-sectional perspective view of the pre-heating chamber showing the field stop mechanisms.

In addition to the water tank 94 filled with fluid 124 surrounding heating chamber 34, around the first aperture 96 to the heating chamber and the second aperture 98 to the heating chamber are located three-quarter wave guide wavelength traps 100. These are also shown in FIG. 8. These wave guide traps are provided to allow the electric fields in the trapped sections to fully form, so that an appropriate field profile from the trap is presented to the heating chamber 34 fields so as to stop the electric fields from exiting the heating chamber 34. By these three devices: the water tank 94, and the wave traps 100 at either end of the heating chamber 34, escape of unwanted amounts of microwave energy from the device is prevented.

The billet 12 is heated in the heating chamber 34 to 50–90° C., and preferably to 80° C., before it passes into the press 14. Press 14 can be a conventional engineered wood industry press, which puts the billet under pressure and applies additional heat to the billet. The heat can be from heated platens 16, from traditional side directed microwave sources, or from side or top directed circular magnetic mode microwave applicators.

In accordance with the best mode contemplated for the application of this invention, assemblies of fibrous material and binding material are heated using microwave energy in a continuous stream, before entering into a continuous press which applies further heat and pressure to the assembly of fibrous material and binding material. Wood fibers of various dimensions and configurations are the preferred fiber, although any plant fiber and a number of inorganic fibers could also be used.

The wood fibers can consist of pieces as small as sawdust, to layers of wood veneers of various thicknesses. Engineered wood products utilizing all sizes of wood fiber between those ranges are possible and include products such as particle board, laminated veneer lumber, oriented strand lumber, plywood, oriented flake board, wafer board, felted composite, laminated composite, short and long strand lumber, layered structural particle board, biocomposites, begasse board, straw board, medium density fiber board and other products. Variables in these products include the size of the wood fiber, the source of the wood fiber, the orientation of the wood fiber, the length and width of the piece of wood fiber, and the type of resin which holds the fibers together. Besides wood, many other sources of plant fiber can be utilized, such as sugar cane fiber from which the sugar has been pressed, coconut fiber, cotton fiber, grass or straw fiber, or virtually any other source of plant fiber.

Other fibers, such as fiberglass or plastic fibers can be used. These fibers of various sizes, orientations, lengths and sources are held together by a binding agent which solidifies and hardens as it cures. This binding agent can be a urea formaldehyde resin, a cross-linking polyvinyl acetate resin, melamine urea formaldehyde resin, resorcinol, phenol formaldehyde resin, aliphatic and polyvinyl acetate resin emulsion adhesives, and other binding agents which harden as they cure, and whose curing is accelerated with an elevated temperature.

Although any plant fiber could be utilized, some very practical possibilities include fiber from sugar cane from which the sugar has been pressed, coconut fiber, cotton fiber, grass or straw fiber, cotton fiber, grass or straw fiber, or virtually any other source of plant fiber. Inorganic fibers which are possibilities for use in this application include fiberglass and plastic fibers of various types.

Using wood fibers, the best mode of the invention will utilize layers of wood veneer, approximately $\frac{1}{8}$" to $\frac{1}{10}$" thick and at least four feet in width. These sheets of veneer will be as long as possible and will be assembled to form a continuous mat of layers of veneer from 3½" to 10 inches. Although a nominal width of 4 feet is anticipated, it is planned that the apparatus and method will accommodate woods of 8 feet width or larger. The width of the billet is not anticipated to be a limitation of this system.

This invention is applicable to a number of curing agents. The characteristic which must be present in a curing agent is that heat hastens the hardening of the curing agent. The source will operate at 915 or 2450 MHz, which is the designated industrial band in the United States. In other countries, other wave lengths could be utilized from 100 to 10,000 MHz. A microwave energy source for this invention is a conventional microwave power source. The power output is nominally 75 kWh for each transmitter used by the system. The current design of the system calls for three microwave sources 38 and twelve applicators 24 to be utilized.

The following description details an additional aspect and embodiment of the invention. In addition to the arrayed automatically vector-tuned single-mode applicator design, there is an advantage for both ends of the heating system to be open so as to allow the passage through of a continuous flow of product to be processed. This would include food items, composites, wood products and any other material or product stream that can be processed in a like manner.

Whenever high power microwaves are used around people, a means must be employed that will reduce the intensity of the microwave power density to levels that are compliant with existing government standards for personnel safety or "stop" the microwave energy fields from exiting the enclosure, i.e., field stop. There are several methods of accomplishing this task. In continuously open ended systems such as this, a prior method involves a long tunnel that is joined to the actual heating portion of the system whose inner linings are fabricated of microwave-transparent material. This material, which is usually made of a plastic material such as teflon or polypropylene, will form a tank or container containing liquid, such as water or a water/glycol mixture that will serve to dissipate the microwaves in this "tunnel," as the microwaves attempt to propagate out through the open ends of the heating system. Though this method will allow large items to be processed and/or heated in the system, there are two significant disadvantages to this dissipative microwave field stop embodiment. First, both infeed and outfeed units are very long (often more than two meters each). This disadvantage is significant enough such that this particular embodiment would not be usable in some applications, such as in pre-heating systems for engineered wood products. The reason is that the length of this dissipative outfeed field stop is long enough so as to allow unwanted temperature loss in the process substrate, and could result in actual curing and/or drying of the wood resins in the continuously flowing product stream, before it reaches the press where curing of the resin is to take place. A second significant disadvantage of this dissipative microwave field stop embodiment is that it can absorb a large portion of the expensive high power microwave energy, that should be instead, channeled for heating and/or processing of the product. In addition, because of the power that is dissipated in the microwave field stop, additional plant cooling must be sometimes employed for these types of systems.

Another method of reducing the microwave energy includes a reactive system rather than a dissipative system, and involves the utilization of small grounded quarter wavelength, or other appropriately dimensioned resonators that are made part of the infeed and outfeed field stopping structures of the system, that are arranged and spaced so as to reflect the microwave energy that is attempting to propagate out through the open ends of the system back into the heating portion of the system, with very little microwave energy dissipation. Usually, this reflected energy is channeled back into the process substrate and utilized in order to achieve the desired process result. Another advantage of this embodiment of this microwave energy field stop over the tunnel method is that the system is much shorter than its dissipative counterpart, previously described. In addition, since there is very little dissipation of the high power microwave energy, there is no requirement for cooling of these elements of the system.

In this reactive system, however, a major disadvantage is that the process substrate is extremely limited in size. This especially pertains to the height above the conveyor system of the process material or billet flow through the system, being continually heated and/or processed. In addition, depending on the operating frequency of the microwave system and the related size of the overall heating system as its size relates to the operational frequency in terms of wavelengths, the effectiveness of this reactive microwave energy field stopping device can be limited to certain microwave modes or field configurations that can be present at the infeed and outfeed ends of the heating portion of the overall system.

The preferred field stop embodiment employed in this invention utilizes a number of improvements to the prior art reactive field stop design approach, and represents a completely new and novel approach. The preferred embodiment in this system employs a computer-controlled reactive field stopping device that is adjustable so as to accommodate a wide range of process substrate sizes and configurations. The system also employs an automatic proximity sensor that will continually sense the position and adjustment profile of the field stop system, and adjust and optimize it for on-going variations in product thickness, in real time.

Figure 14:
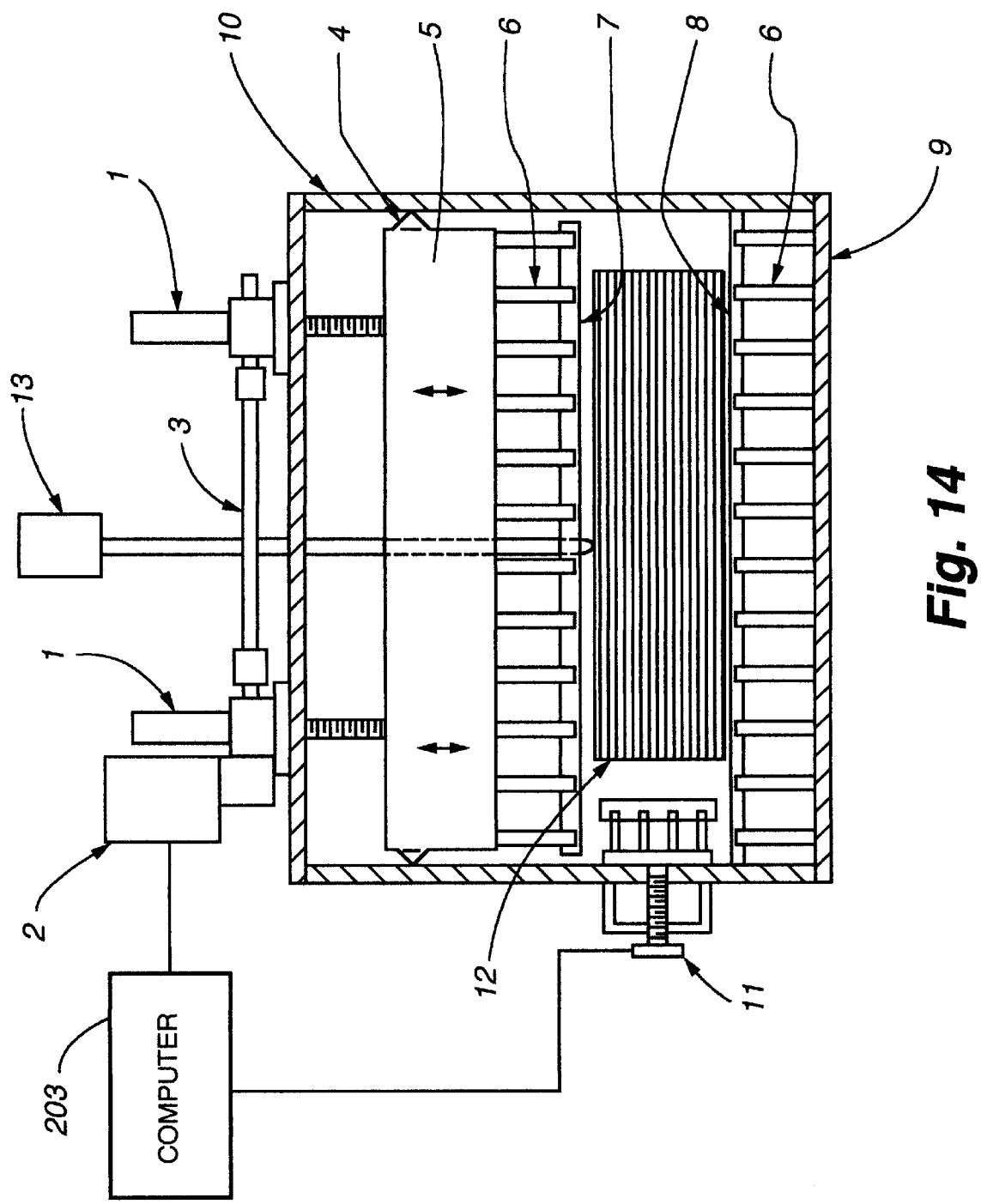
FIG. 14 is a schematic of a field stop useful in the present invention.

A preferred embodiment of this field stop invention is shown in FIG. 14. FIG. 14 illustrates a field stop configuration according to the present invention. The billet of product (wood or otherwise) 12 passes over a lower choke platen 8. Preferably the choke platen 8 is glass reinforced teflon. An upper choke platen 7 is above the billet 12. Preferably, the upper choke platen 7 is glass reinforced teflon. A lower field stop resonator is shown as 9. The upper field stop resonator (pin) is shown as 6. The resonators 6 and 9 may be quarter electrical wavelength microwave resonators grounded at one end and embedded in the platens (or plates) 7 and 8. The key to the novel field stop invention is the computer-controlled computer 203 adjustable upper microwave field stop reactive resonator assemblies 5, 6 and 7. These assemblies 5, 6 and 7 can be moved in an upward or downward fashion via a series of connections to a motor. Drive motor 2 is coupled to mechanical actuator 1 which is coupled to cross connecting motor shaft 3. These components drive the array up or down as the computer determines is necessary. The drive motor 2 is in communication with a computer (not shown) which determines the appropriate position of billet side resonator array choke plates 11. Item 4 is a sliding high power microwave contact.

The choke plates are either pure teflon, glass re-enforced teflon or other microwave dielectric plate material that will enhance the electric field coupling to these field stopping resonant structures and increase the effectiveness of the system. Since it is possible for the microwave energy exiting the heating portion of the overall system to be in several field configurations or propagating modes, the orientation, installation and fabrication geometry of the arrayed stop resonator is selected so that they will couple effectively to the exiting fields from the heating portion of the overall system and introduce microwave fields of their own that cancel and reflect the microwave fields that are attempting to exit the heating structure.

Another advantage of this embodiment is that the continually adjusted field stopping system will present and maintain a limited set of boundary conditions imposed on the field equations governing the set of propagating microwave fields attempting to exit the heating portion of the overall system, thereby maintaining a high probability of an effective coupling to the reactive resonators in the field stop system array over a wide range of product thicknesses and profiles.

Another embodiment of this system is the optional addition of another adjustable resonator array very similar to the top and bottom plates, on the sides of the field stopping system. This will suppress propagating microwave fields that are exiting the heating portion of the overall system in the clearance regions on either side of the process substrate flowing through the system. These optional automatically adjustable side choke platens are configured as shown at 11 to reduce these propagating microwave fields in a variety of possible modes for very thick engineered wood billets or lay-ups, mats or other process substrate.

Another advantage of this field stop aspect of the invention is that this reactive system accomplishes a high degree of reduction of the high energy microwave fields attempting to exit the heating portion of the overall system that occupies a very short insertion length within the running production line. This system can be implemented in systems with total microwave heating powers of 250,000 watts or more, in approximately one meter of line length or less.

Another advantage of this system is that in the event of a failure of the high power microwave generators, the applicator can provide an even heating profile of the billet.

While there is shown and described the present preferred embodiment of the invention, it is to be distinctly understood that this invention is not limited thereto but may be variously embodied to practice within the scope of the following claims.

We claim:

1. A field stop system for use with a heating enclosure that heats an object with microwaves, the system comprising:

one or more microwave resonators;

a positioning mechanism coupled to the microwave resonators for moving the resonators in relation to the object; and a sensing and controlling system coupled to the positioning mechanism for determining a position of the microwave resonators relative to the object and, in response, causing the mechanism to move the resonators in relation to the object.

2. The field stop system of claim 1, wherein the positioning mechanism comprises a motor coupled to a mechanical actuator.

3. The field stop system of claim 1, wherein the sensing and controlling system comprises a sensor and a computer.

4. A system for heating an object with microwaves, the system comprising:

a heating enclosure for heating the object with microwaves; and a field stop system including:
   one or more microwave resonators;

a positioning mechanism coupled to the microwave resonators for moving the resonators in relation to the object; and a sensing and controlling system coupled to the positioning mechanism for determining a position of the microwave resonators relative to the object and, in response, causing the mechanism to move the resonators in relation to the object.

* * * * *